United States Patent [19]

Saiki

[11] Patent Number: 4,889,424

[45] Date of Patent: Dec. 26, 1989

[54] MOVIE CAMERA SHUTTER

[75] Inventor: Albert K. Saiki, Los Angeles, Calif.

[73] Assignee: Panavision, Inc., Tarzana, Calif.

[21] Appl. No.: 135,161

[22] Filed: Dec. 18, 1987

[51] Int. Cl.$^4$ .............................................. G03B 9/10
[52] U.S. Cl. .................................. 352/216; 352/210; 352/211
[58] Field of Search ..................... 352/216, 217, 210

[56] References Cited

U.S. PATENT DOCUMENTS 1,873,742  8/1932  Debrie .................................. 352/216
3,764,199  10/1973  Neudecker ........................... 352/210
4,699,483  10/1987  Swinehart ............................ 352/217

Primary Examiner—Monroe H. Hayes
Attorney, Agent, or Firm—Lyon & Lyon

[57] ABSTRACT

A shutter system for a movie camera or the like which controls the exposure of film including a main shutter wheel rotatably mounted on an axis and first and second adjustable shutter wheels positioned adjacent to and coaxially rotating therewith. The first and second adjustable shutter wheels may selectively pivot relative to the main shutter wheel in opposite angular directions so as to close off a portion or all of the arcuate apertures within the main shutter wheel.

15 Claims, 5 Drawing Sheets

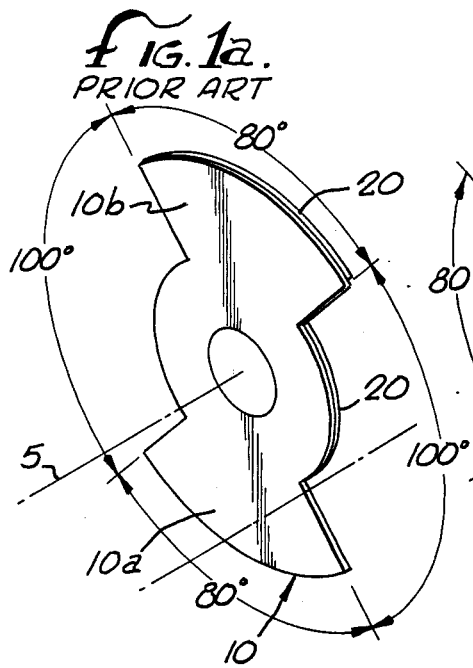
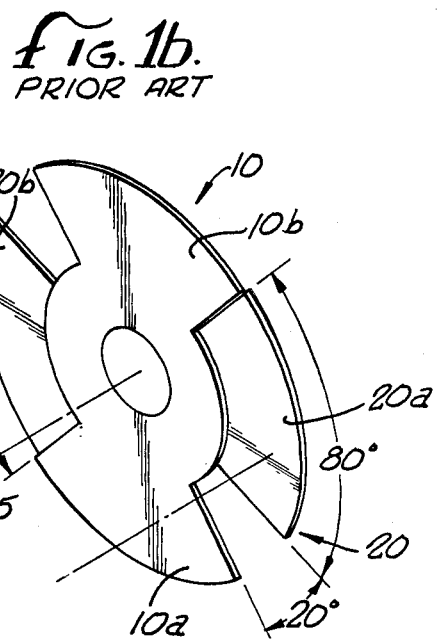
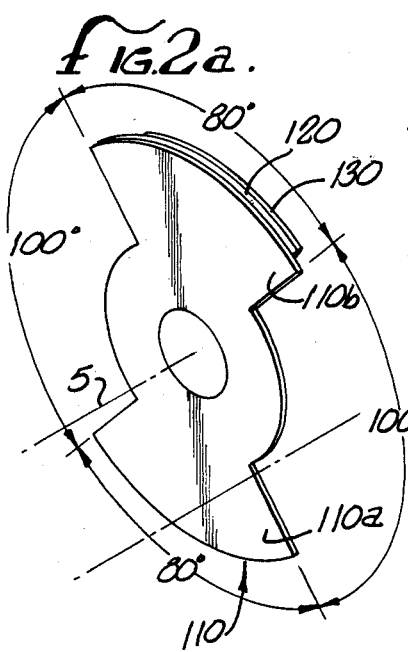
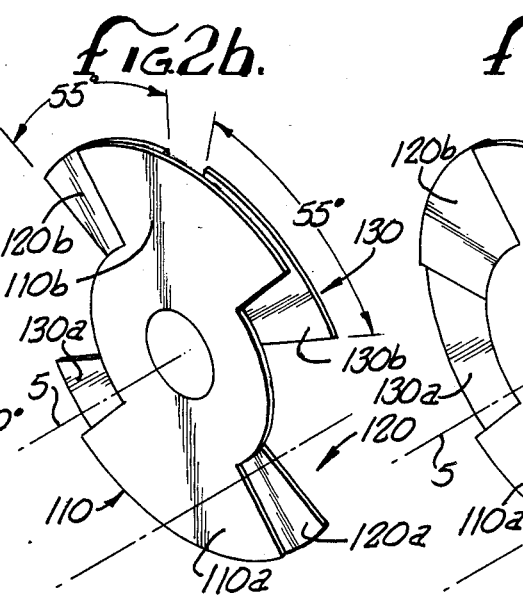
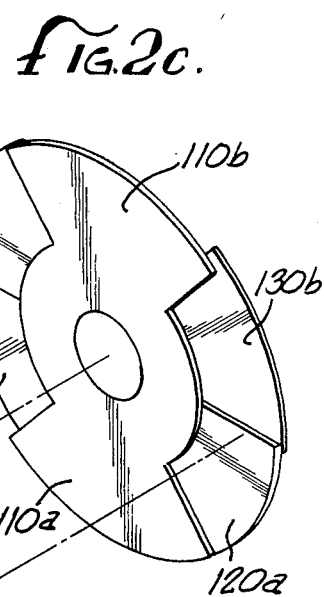
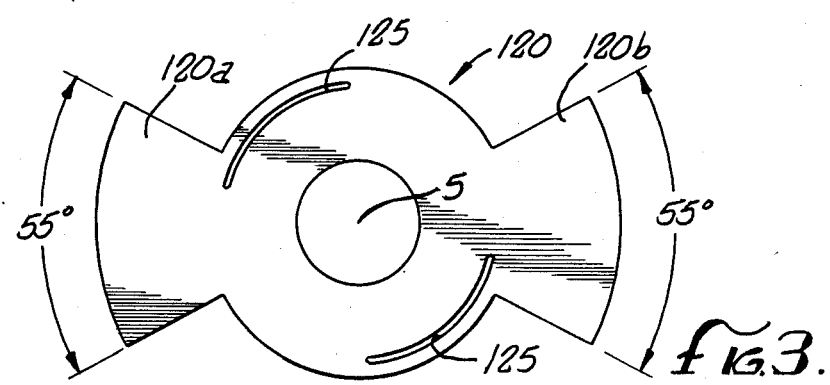

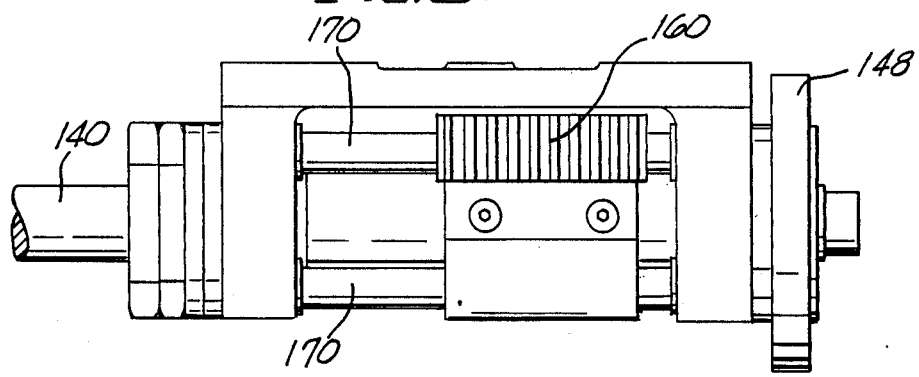
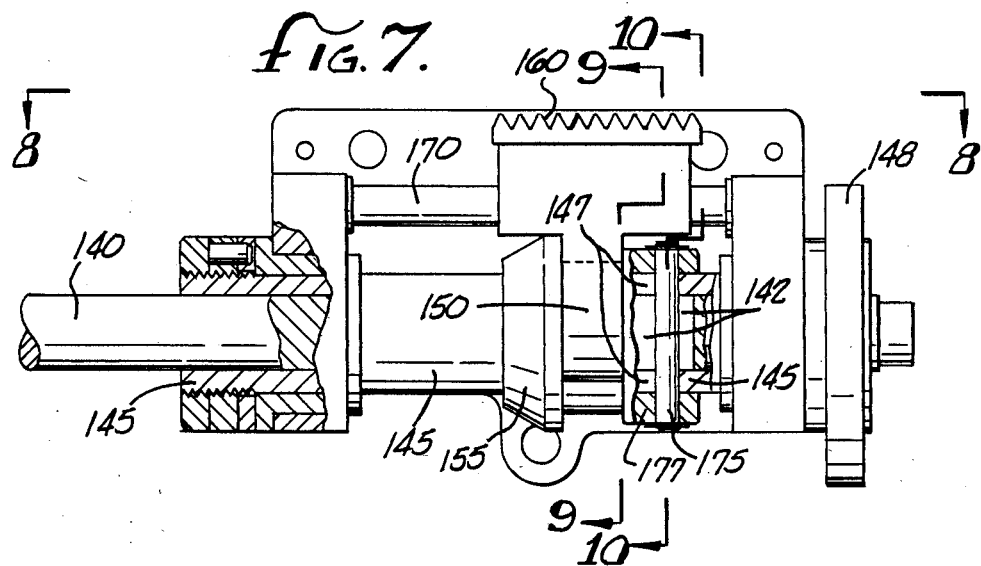
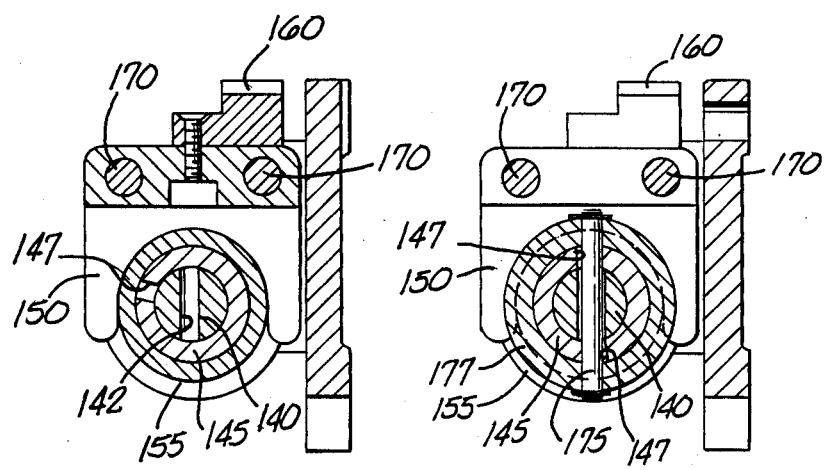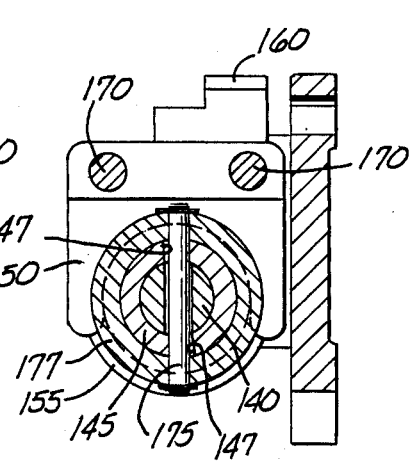

MOVIE CAMERA SHUTTER

BACKGROUND OF THE INVENTION

The field of the present invention is shutters for movie cameras or the like.

A motion picture camera exposes film by allowing light to pass through a lens opening and then through a shutter aperture. The shutter rotates at a speed synchronous with that of the passing film frames. One form of prior art shutter is shown in FIGS. 1a and 1b illustrating what will be called the stationary or main shutter wheel 10 and the adjustable shutter wheel 20. Both the main shutter wheel 10 and the adjustable shutter wheel 20 are generally of a bow tie-like shape and rotate about a shaft on an axis 5 at a speed which is synchronous with that of the film. Inside the camera, the film is positioned to be exposed to light through the apertures between the two opposing shutter elements or extensions 10a and 10b. Referring to FIG. 1a, as the stationary shutter wheel 10 rotates, light passes through the camera lens onto the film frame which is aligned behind the shutter aperture for the amount of time the aperture is so aligned allowing the film to be exposed. The film is advanced from one frame to the next frame while the light path is interrupted by the shutter elements 10a and 10b. Thus two frames of films are exposed and advanced for each revolution of the shutter 10.

In order to control exposure, a second shutter wheel, the adjustable shutter wheel 20, is included. The adjustable shutter wheel 20 rotates with the shutter wheel 10 and therefore also rotates at a synchronous speed with the film. By an adjustment mechanism, the adjustable shutter wheel 20 may be pivotally adjusted relative to the stationary shutter wheel 10. The adjustable shutter wheel has two shutter extension members 20a & 20b which may cover some portion of the two apertures between stationary shutter wheel elements 10a & 10b. By pivoting the adjustable shutter wheel 20 relative to shutter wheel 10, a portion of the arc of each aperture may be covered by the rotating shutter extensions 20a & 20b.

With the prior art shutter arrangement of FIGS. 1a and 1b, it has been conventional to provide shutter elements 10a, 10b, 20a and 20b with an arcuate extent of about 80° whereby with those shutter elements exactly superimposed, as shown in FIG. 1a, the two apertures are 100° each. An aperture of this size provides a highly acceptable amount of light to the film to allow better lens stop settings than if the aperture was smaller but it also makes it impossible to completely close the 100° apertures with the 80° shutter elements 20a and 20b. Moreover, the closing of the aperture progresses in only one direction at one time with respect to the stationary shutter 10, i.e. such as clockwise, whereby the location of the aperture becomes asymmetrical with respect to shutter 10 and, for example, with the timing of the film movement. This asymmetry can be undesirable when attempting to create certain cinematographic effects.

There are other conventional rotating adjustable shutters for movie cameras that differ from the shutter of FIGS. 1a and 1b, such as those having two aperture openings of about 88° each but the light admitted thereby is too restricted, particularly in low light level conditions. Another prior art adjustable rotating shutter uses a single shutter element which creates a single aperture but it has the similar deficiencies and the additional problem of balancing.

SUMMARY OF THE INVENTION

The present invention is directed to improved shutters for movie cameras or the like for a more versatile control of the exposure of the film.

An object of this invention is to provide an adjustable rotating shutter for movie cameras wherein at least three shutter wheels are adjustable relative to each other during operation of the camera to adjust the light aperture formed by such wheels from a very large arcuate opening for maximum light to a very small or completely closed aperture for a complete "dissolve" of the scene being photographed.

A further object of this invention is to provide such an adjustable rotating shutter wherein the aperture is reduced and expanded in substantially equal amounts in each circumferential direction rather than in only one direction.

A more detailed object of the present invention is to provide a complete shutter system wherein a main shutter wheel is rotatably mounted on an axis, the main shutter wheel having two opposed radially extending main shutter elements formed with arcuate apertures therebetween; first and second adjustable shutter wheels adjacent to and coaxially rotating with the main shutter wheel with each having two opposed, radially extending shutter members; and the first and second adjustable shutter wheels are selectively adjustable to pivot relative to the main shutter wheel in opposite angular directions such that the extending shutter members close off a portion or all of the arcuate apertures between the main shutter elements.

BRIEF DESCRIPTION OF THE DRAWINGS

FIG. 1a and FIG. 1b are perspective views of a prior art shutter wheel with a single pivoting adjustable shutter wheel;

FIGS. 2a, 2b, and 2c are perspective views of a shutter according to the present invention, FIG. 2a illustrates the shutter in the completely open position, FIG. 2b illustrates the shutter in a partially closed position, and FIG. 2c illustrates the shutter in the completely closed position;

FIG. 3 is a front view of an adjustable shutter wheel which may be used in the present invention;

FIG. 7 is a side elevation view with portions in section of a shutter adjusting means according to the present invention;

FIG. 8 is a top or plan view of the shutter adjusting means of FIG. 7 taken along the line 8—8;

FIG. 9 is a cross sectional end view taken along the line 9—9 of FIG. 7;

FIG. 10 is a cross sectional end view taken along the line 10—10 of FIG. 7;

DETAILED DESCRIPTION OF THE PREFERRED EMBODIMENT

Figure 4:
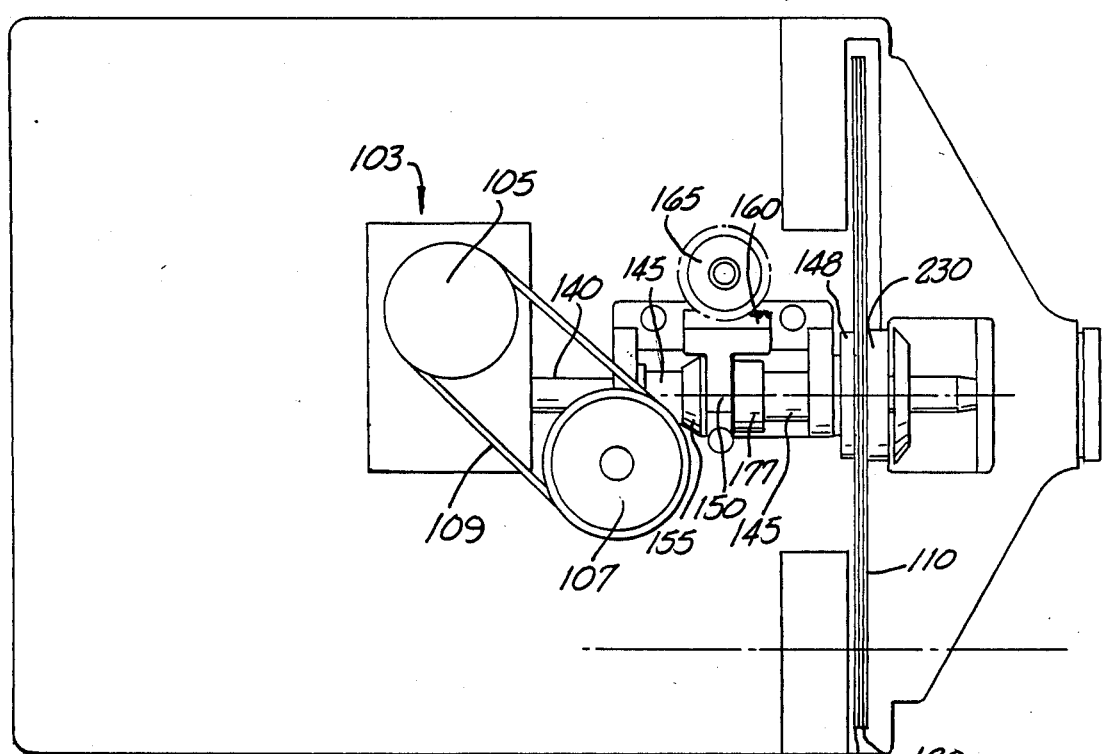
FIG. 4 is a diagrammatic side view of a movie camera and shutter system which may be used with the present invention.

The preferred embodiment will now be described with respect to the drawings. FIGS. 2a, 2b, and 2c illustrate a rotating shutter system comprised of a main shutter wheel 110 having a pair of opposing shutter elements 110a and 110b extending radially outward therefrom. The main shutter wheel 110 rotates about an axis 5 at a speed corresponding to the rate at which the film is advanced, namely, one half of a revolution for each frame of film advanced. The extending main shutter elements 110a and 110b form arcuate apertures therebetween. One conventional shutter system in the movie industry has the main shutter elements 110a and 110b with arcs of 80° leaving the arcuate apertures with arcs of 100°.

Adjacent to and rotating coaxially with the main shutter element 110 are two adjustable shutter wheels 120, 130. The adjustable shutter wheel 120 has two opposed and radially extending shutter members 120a and 120b. The adjustable shutter wheel 130 has two opposed and radially extending shutter members 130a and 130b. The adjustable shutter wheels 120 and 130 rotate coaxially with the main shutter wheel 110, but the adjustable shutter wheels 120 and 130 may be adjusted to pivot relative to the main shutter wheel 110 thereby selectively extending over a portion of the arcuate apertures between the main shutter elements 110a and 110b. The adjustable shutter wheels 120 and 130 pivot in opposite angular directions from one another in order to close off at least a portion of the arcuate apertures between the main shutter elements 110a and 110b in substantially equal amounts from each side of the arcuate apertures as shown in FIG. 2b which is advantageous in some cinematographic techniques. FIG. 2c illustrates the radially extending shutter members 120a and 120b and 130a and 130b completely closing off the arcuate apertures between the main shutter elements 110a and 110b.

Unlike the single adjustable shutter 20 of the prior art, as shown in FIGS. 1a and 1b, which only closes off the apertures in one direction between the opposing shutter elements 10a and 10b, the dual pivoting shutters 120 and 130 close off the arcuate apertures between the main shutter elements 110a and 110b in substantially equal amounts from each side. Therefore as the entire shutter assembly rotates, the center of the remaining aperture between main shutter elements 110a and 110b is unchanged no matter how far the adjustable shutter wheels 120 and 130 pivot toward closing off the aperture opening. Therefore, no adjustment to the synchronous control of the system need be made to compensate for the position of the aperture opening as the shutter assembly pivots. The shutter positioning achieved by the dual pivoting shutters 120 and 130 is particularly useful in certain filming techniques.

Further, since each of the shutter elements 120a, 120b, 130a and 130b extends 55° circumferentially, it is possible to completely close the 100° aperture opening. By providing this capability it is possible to completely fade or dissolve to black during filming of a scene, whereby the dual pivoting shutters 120 and 130 achieve another desirable filming function.

FIG. 3 illustrates a typical adjustable shutter wheel 120 having two opposing shutter members 120a and 120b. The adjustable shutter wheel 120 rotates about center axis 5. The adjustable shutter wheel 120 also has a pair of arcuate slots 125 to provide an opening to allow light through the adjustable shutter 120 for timing of a mirror stop in a conventional manner. The slot 125 corresponds to a small opening in the main shutter wheel 110.

FIG. 4 diagrammatically illustrates a conventional movie camera 100 with a shutter system according to the present invention. The system includes a motor drive system, generally designated 103 which rotates the pulley 105 at a speed to correspond to the rate at which the film is to be advanced. A film movement drive is connected to a pulley 107 driven by the power takeoff pulley 105 through a cog belt 109. The main shutter 110 and the first and second adjustable shutters 120 and 130 are connected to a driveshaft 140 of drive system 103 through a connecting means between sleeve extension 148 and the cap piece 230. The shutters 110, 120, 130 rotate with the drive shaft 140, but the shutters 120 and 130 are allowed certain adjustment with respect to drive shaft 140 and shutter 120 in a manner described below. With the above combination, the film is advanced and the shutters 110, 120, 130 are rotated at synchronous speeds.

Figures 5, 6:
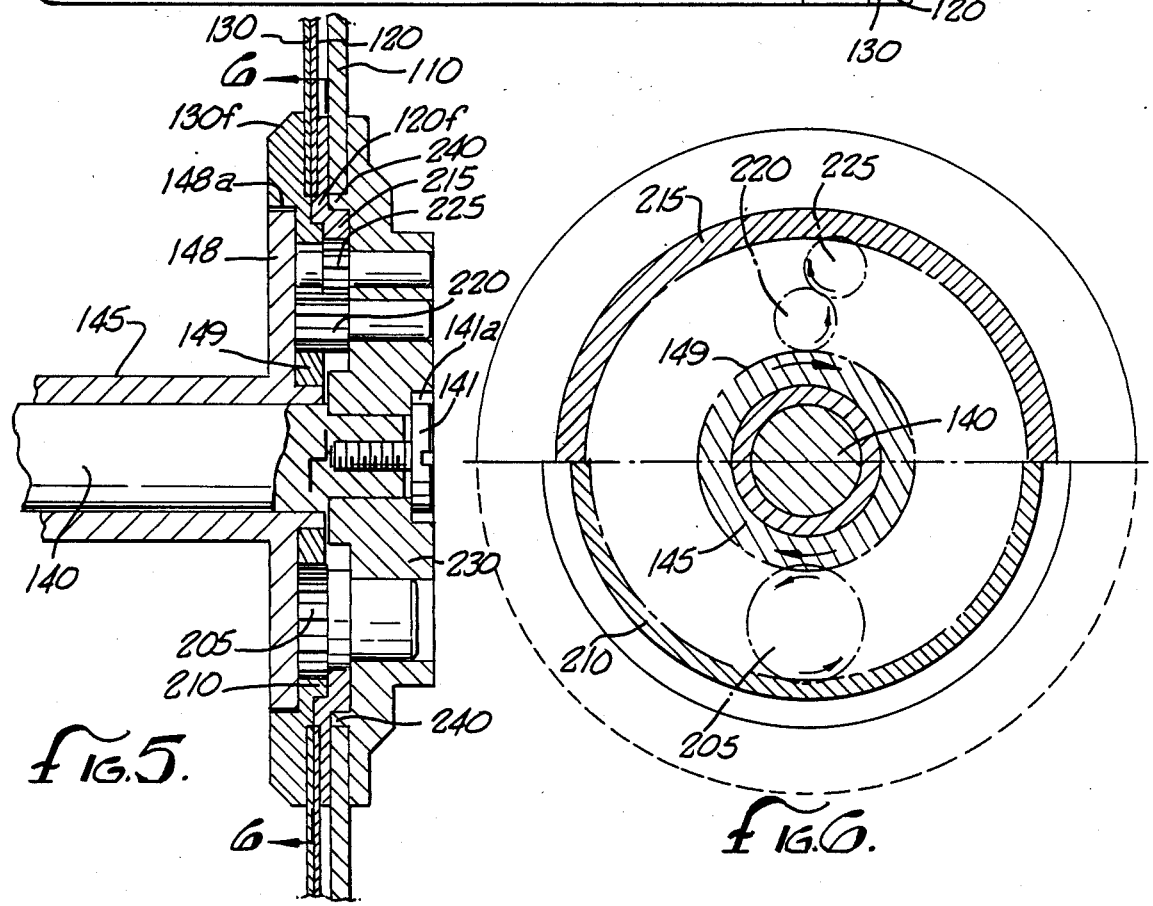
FIG. 5 is a cross sectional side view of a shutter and adjustment mechanism according to the present invention.
FIG. 6 is a cross section of the shutter adjustment mechanism taken substantially along the line 6—6 of FIG. 5.

FIG. 5 illustrates a cross section of the driving means for the shutter wheels. The main drive shaft 140 is connected to the main shutter wheel 110 through a cap piece 230 which rotates therewith. A screw 141, which is threaded into the shaft 140, secures the cap piece 230 to the shaft 140. The main shutter wheel 110 is fixed to the cap piece 230. The cap piece 230 has a recess 141a to accommodate the head of the screw 141 thereby providing a flush outer face. A concentric sleeve 145 around the drive shaft 140 rotates with the drive shaft 140, but is rotatably or pivotably adjustable therewith. The sleeve 145 has a radially extending flange portion 148 forming part of the support for the first and second adjustable shutters 120 and 130.

Referring also to FIG. 6, the sleeve 145 is operably connected to the first adjustable shutter 120 through a sun gear 149 mounted on flange 148 and first and second planet gears 220 and 225. The first planet gear 220 engages sun gear 149. The second planet gear 225 engages the first planet gear 220 and also engages a ring gear 215 which in turn is connected to the first adjustable shutter wheel 120. Similarly, a secondary planet gear 205 engages the sun gear 149 and also engages a second ring gear 210 which in turn is attached to the second adjustable shutter wheel 130. The number of teeth of each of the first and second planet gears 220 and 225 is one half that of the secondary planet gear 205. Therefore as the sleeve 145 is rotatably adjusted relative to shaft 140, the first and second adjustable shutter wheels 120 and 130 pivot relative to the main shutter wheel 110 in equal amounts but in opposite angular directions.

As viewed in FIG. 4, an adjusting spur gear 165 is provided for adjusting the coverage of the aperture by the adjustable shutter wheels 120 and 130. The aperture size control is accomplished by rotating adjusting spur gear 165 which engages a toothed rack 160 for moving a fork body 150 linearly in a direction parallel to the axis of the shaft 140. The fork body 150 is supported on a pair of parallel shafts 170 that in turn are parallel to shaft 140. The fork body 150 has a fork portion engaging a collar 155 which is slidably mounted on the sleeve 145 for adjusting and controlling the exposure aperture of the shutter system.

Figures 11, 12, 13:
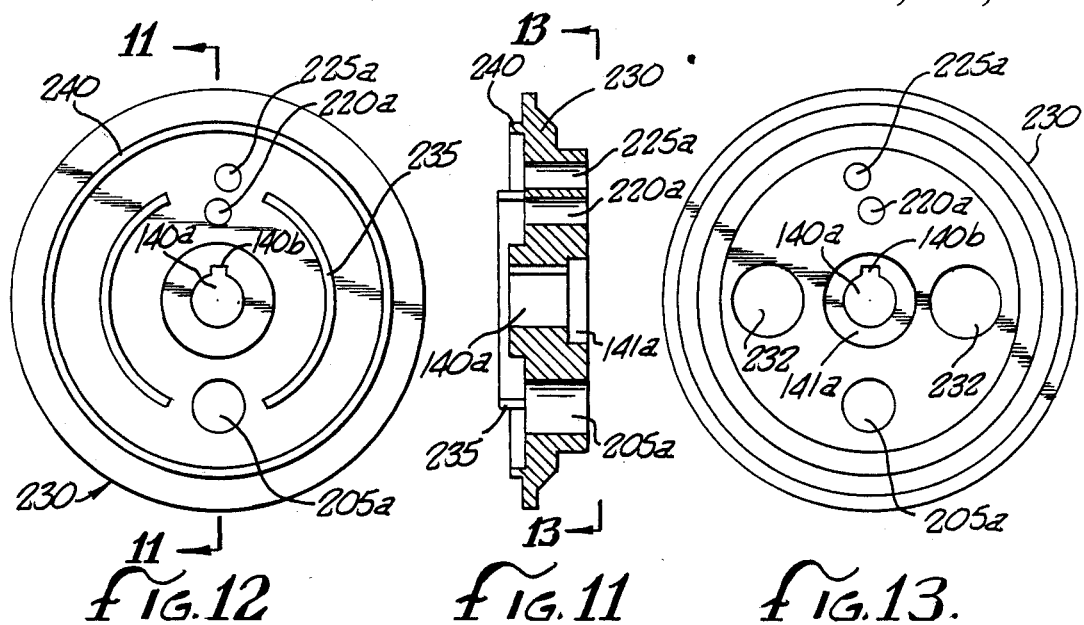
FIG. 11 is a cross sectional side view of the shutter cap piece taken along the line 11—11 of FIG. 12.
FIG. 12 is a rear view of the cap piece of FIG. 11.
FIG. 13 is a front view of the cap piece of the drive mechanism shown in FIGS. 5 and 11, taken along line 13—13 of FIG. 11.
Figure 14:
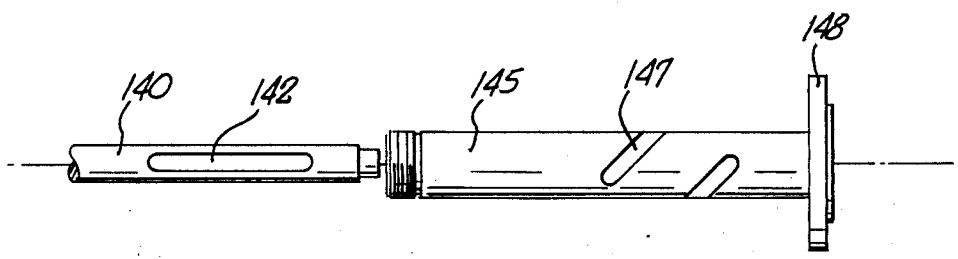
FIG. 14 is an exploded view of a shaft and sleeve combination including the slots for providing pivoting shutter adjustment.

FIGS. 11 through 13 illustrate, in detail, the main cap piece 230. The cap piece 230 has holes 220*a*, 225*a* and 205*a* to support the first planet gear 220, the second planet gear 225 and the secondary planet gear 205, respectively. The center of the cap piece 230 has a hole 140*a* with a keyway 140*b* for mounting the cap piece on the shaft 140. As shown in FIG. 12, the back side of the cap piece 230 has a ridge or spacer 240 (also shown in FIG. 5), which serves to center and rotatably support a flange portion 120*f* of shutter 120 on the cap piece 230. A second ridge or spacer 235 is also located on the back side of the cap piece 230 to provide strength and stability to the cap piece. The front side of the cap piece 230 has two timing holes 232 which are used to assist in conventional filming control. The flange 148 has an outer peripheral surface 148*a* for rotatably supporting the support flange 130*f* of the shutter 130.

The shutter system for controlling exposure will now be described with reference to FIGS. 7 through 14. The sleeve 145 rotates with the drive shaft 140 through interconnection by a pin 175. As best understood from the exploded view of FIG. 14, the shaft 140 is located inside the sleeve 145. The shaft 140 has a slot 142 running longitudinally through its axis. The sleeve 145 has a corresponding slot 147 which is helical in shape through the sleeve 145. The pin 175 is secured to a ring 177 which is in turn connected to the collar 155 or the ring 177 and collar 155 may be made as a single unit. As the fork 150 axially moves the collar 155 and ring 177, the pin 175 is pushed along the shaft slot 142 and sleeve slot 147, but due to the helical shape of the sleeve slot 147, the sleeve 145 pivots or adjustably rotates with respect to the shaft 140.

Referring particularly to the partial cutaway in FIG. 7, the plan view in FIG. 8, and the cross sections of FIGS. 9 and 10, as the fork 150 presses against the collar 155 during movement to the left as viewed in FIG. 7 or against the ring 177 during movement to the right as viewed in FIG. 7, the pin 175 is forced to follow along both straight slot 142 in shaft 140 and the helical slot 147 in the sleeve 145 thereby adjusting or pivoting the sleeve 145 with respect to the main shaft 140. Of course, the shaft 140, sleeve 145, collar 155, ring 177 and pin 175 all continue to rotate together while filming to operate the shutter. Since the relative position of sleeve 145 to the shaft 140 determines the relative positions of the adjustable shutters 120 and 130 (as described above with reference to FIGS. 5 and 6) the helical sleeve slot 147 in sleeve 145 provides a means for pivoting the adjustable shutter wheels 120 and 130 with respect to the main shutter wheel 110.

Figures 15A, 15B:
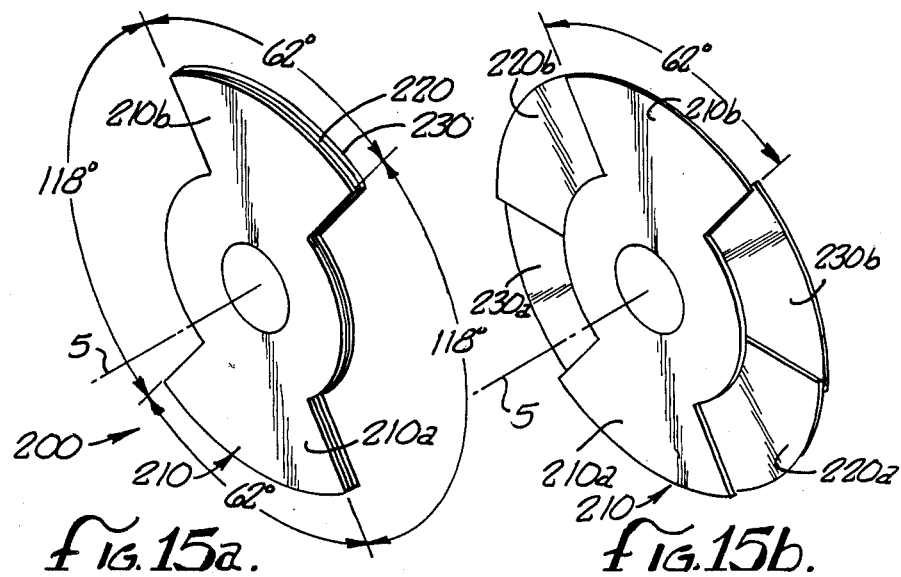
FIGS. 15a and 15b are perspective views of another embodiment of the shutter of the present invention.

FIGS. 15*a* and 15*b* are perspective views of an alternative shutter 200. This shutter 200 is similar to the shutter of FIG. 2*a* and is comprised of a main shutter wheel 210 having a pair of opposing shutter elements 210*a* and 210*b* extending radially outward therefrom. The main shutter wheel 210 rotates on a shaft about an axis 5 at a speed corresponding to the rate at which the film is advanced. The extending main shutter elements 210*a* and 210*b* for arcuate apertures therebetween. Each of the arcs of the shutter elements 210*a* and 210*b* are about 62° leaving arcuate apertures of 118°.

Adjacent to and rotating coaxially with the main shutter wheel 210 are two adjustable shutter wheels 220 and 230. The adjustable shutter wheel 220 has two opposed and radially extending shutter members 220*a* and 220*b* and the adjustable shutter wheel 230 has two similar extending shutter members 230*a* and 230*b*. Both the shutter members 220*a* and 220*b* have arcs of about 62° leaving arcuate apertures with arcs of 118°. Similarly the shutter members 230*a* and 230*b* also have arcs of about 62° leaving arcuate apertures of 118°.

The adjustable shutter wheels 220 and 230 rotate coaxially with the main shutter wheel 210, but they may be adjusted to pivot relative to the main shutter wheel 210 thereby selectively extending over a portion of the arcuate apertures between the main shutter elements 210*a* and 110*b*. The adjustable shutter wheels 220 and 230 pivot in opposite angular directions in order to close off a portion of the arcuate apertures between the main shutter elements 210*a* and 210*b* in substantially equal amounts from each side. Since the main shutter wheel 200 has the main shutter elements 210*a*, 210*b* and extending shutter members 220*a*, 220*b* and 230*a*, 230*b* all of the same arcuate size, the size of the main shutter elements 210*a* and 210*b* can be minimized yet maintaining the capability of completely closing off the apertures as in FIG. 15*b*. The 62° arc is chosen to provide a 2° overlap between shutter elements when complete closing off of the aperture opening is desired. The larger 118° aperture opening (as compared to the 100° aperture opening in the embodiment of FIG. 2*a*) allows for greater film exposure when desired.

Figures 16A, 16B:
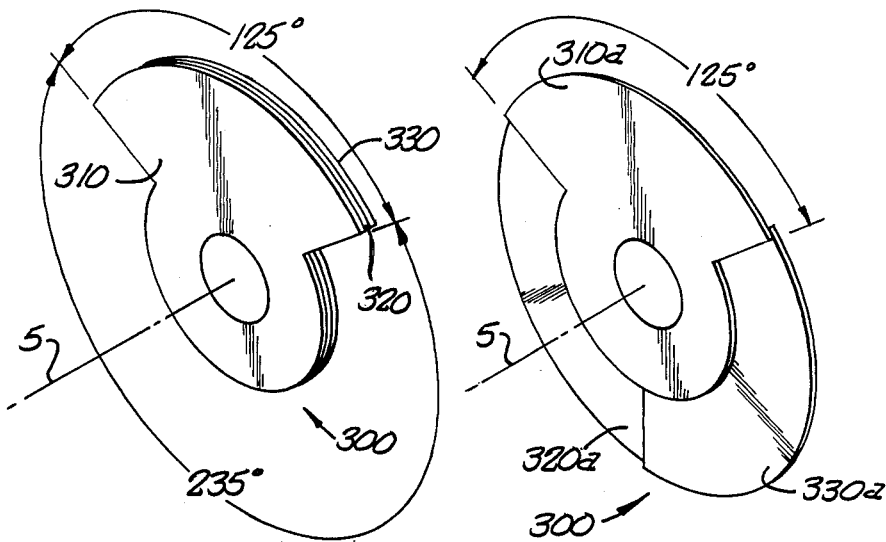
FIGS. 16a and 16b are perspective views of still another embodiment of the shutter of the present invention.

FIGS. 16*a* and 16*b* illustrate yet another alternative shutter 300. This shutter 300 is comprised of a main shutter wheel 310 and two adjustable shutter wheels 320 and 330 which are adjacent to and rotate with the shutter wheel 310. The main shutter wheel has one shutter element 310*a* extending radially outward therefrom thereby forming an arcuate aperture circumferentially adjacent to the element 310*a*. Choosing the arc of the main shutter element 310*a* to be 125°, the element 310*a* forms an arcuate aperture of 235°. The adjustable shutter wheel 320 has a radially extending shutter member 320*a* and adjustable shutter wheel 330 has a radially extending shutter member 330*a*. With the shutter members 320*a* and 330*a* having arcs of 125°, each adjustable shutter wheel would also have an arcuate aperture of 235°. By pivoting the adjustable shutter wheels 320 and 330 in opposite angular directions, the arcuate aperture of the main shutter wheel 310 may be partially closed off or as viewed in FIG. 16*b* entirely closed off.

Choosing the main shutter element 310*a* and the adjustable shutter members 320*a* and 330*a* to have arcs of 125° allows a 5° overlap between adjacent wheels when the shutter 300 is in the completely closed off position as in FIG. 16*b*.

Unlike the previous embodiments, the shutter wheel 300 is not symmetrical and may encounter balance difficulties during rotation. The imbalance may be corrected by installation of balancing weights on the wheels 310, 320 and 330 opposite to the main shutter element 310*a* and the shutter members 320*a* and 330*a*.

Thus, a shutter system for a movie camera or the like is disclosed which employees a dual adjustable shutter system. While embodiments and applications of this invention have been shown and described, it would be apparent to those skilled in the art that many more modifications are possible without departing from the inventive concepts herein. The invention therefore is not to be restricted except in the spirit of the appended claims.

I claim:

1. A shutter for exposing film in a move camera comprising:
   a main shutter wheel rotatably mounted to rotate about a first axis and having at least one radially extending main shutter element forming at least one arcuate aperture between circumferentially successive main shutter elements:
   a first adjustable shutter wheel rotatably mounted to rotate about said first axis and being adjacent said main shutter wheel;
   a second adjustable shutter wheel rotatably mounted to rotate about said first axis and being adjacent said main shutter wheel and first adjustable shutter wheel, wherein each said adjustable shutter wheel has the same number of radially extending shutter members as the radially extending main shutter elements;
   means for pivoting said first and second adjustable shutter wheels relative to said main shutter wheel in opposite angular directions for causing said radially extending shutter members on said adjustable shutter wheels to selectively and progressively extend over each of said arcuate apertures between said main shutter elements;
   a drive shaft connected to said man shutter wheel;
   a sleeve around said drive shaft and rotating therewith, said sleeve being rotatably adjustable with respect to said drive shaft and having a sun gear thereon;
   a first ring gear connected to said first adjustable shutter;
   a second ring gear connected to said second adjustable shutter;
   a first planet gear engaging said sun gear and said first ring gear;
   a second planet gear engaging said sun gear; and
   a third planet gear engaging said second planet gear and said second ring gear.

2. The shutter according to claim 1 wherein said main shutter wheel has only two opposed main shutter elements.

3. The shutter according to claim 2 wherein said main shutter elements have arcs of about 80°.

4. The shutter according to claim 2 wherein said shutter members of said first and second adjustable shutters have arcs of about 55°.

5. The shutter according to claim 2 wherein said shutter members of said first and second adjustable shutters have arcs of about 50° to 80°.

6. The shutter according to claim 2 wherein said main shutter elements and said shutter members of said first and second adjustable shutters have arcs of about 62°.

7. The shutter according to claim 1 wherein said shutter members of said first and second adjustable shutters are pivotable to completely close off said arcuate apertures between said main shutter elements.

8. A shutter for exposing film in a movie camera comprising:
   a main shutter wheel rotatably mounted to rotate about a first axis and having at least one radially extending main shutter element forming at least one arcuate aperture between circumferentially successive main shutter elements;
   a first adjustable shutter wheel rotatably mounted to rotate about said first axis and being adjacent said main shutter wheel;
   a second adjustable shutter wheel rotatably mounted to rotate about said first axis and being adjacent said main shutter wheel and first adjustable shutter wheel, wherein each said adjustable shutter wheel has the same number of radially extending shutter members as the radially extending main shutter elements;
   means for pivoting said first and second adjustable shutter wheels relative to said main shutter wheel in opposite angular directions for causing said radially extending shutter members on said adjustable shutter wheels to selectively and progressively extend over each of said arcuate apertures between said main shutter elements;
   means for rotating said main shutter wheel and said adjustable shutter wheels together at a rate corresponding to that of the film,
   wherein said means for pivoting and said means for rotating comprise:
   a drive shaft connected to said main shutter wheel;
   a sleeve around said drive shaft and rotating therewith, said sleeve being rotatably adjustable with respect to said drive shaft and having a sun gear thereon;
   a first ring gear connected to said first adjustable shutter;
   a second ring gear connected to said second adjustable shutter;
   a first planet gear engaging said sun gear and said first ring gear;
   a second planet gear engaging said sun gear;
   a third planet gear engaging said second planet gear and said second ring gear.

9. A shutter for exposing film in a movie camera comprising:
   a main shutter wheel rotatably mounted to rotate about a first axis and having at least one main shutter element forming at least one arcuate aperture circumferentially adjacent to each said main shutter element;
   a first adjustable shutter wheel rotatably mounted on the first axis;
   a second adjustable shutter wheel rotatably mounted on the first axis, wherein each adjustable shutter wheel has a number of shutter members equal to the number of main shutter elements, with the adjustable shutter being adjacent to, in parallel with, and radially adjustable with respect to the main shutter wheel, and the first adjutable shutter wheel rotatably adjusts in an opposite angular direction to that of the second adjustable shutter wheel;
   a drive shaft connected to said main shutter wheel;
   a sleeve around said drive shaft and rotating therewith, said sleeve being rotatably adjustable with respect to said drive shaft and having a sun gear thereon;
   a first ring gear connected to said first adjustable shutter;
   a second ring gear connected to said second adjustable shutter;
   a first planet gear engaging said sun gear and said first ring gear; and gears between said sun gear and said second ring gear for rotating said second ring gear in a direction opposite to that of said first ring gear.

10. The shutter according to claim 9 wherein said main shutter wheel has only two opposed main shutter elements.

11. The shutter according to claim 10 wherein said main shutter elements have arcs of abut 80°.

12. The shutter according to claim 10 wherein said shutter members of said first and second adjustable shutters have arcs of about 55°.

13. The shutter according to claim 10 wherein said shutter members of said first and second adjustable shutters have arcs of about 50° to 80°.

14. The shutter according to claim 9 wherein said shutter members of said first and second adjustable shutters are pivotable to completely close off said arcuate apertures between said main shutter elements.

15. The shutter according to claim 10 wherein said main shutter elements and said shutter members of said first and second adjustable shutters have arcs of about 62°.

* * * * *